(12) United States Patent
Collins

(10) Patent No.: US 10,157,353 B2
(45) Date of Patent: Dec. 18, 2018

(54) NAME VARIANT EXTRACTION FROM INDIVIDUAL HANDLE IDENTIFIERS

(71) Applicant: Acxiom Corporation, Little Rock, AR (US)

(72) Inventor: W. Dwayne Collins, Conway, AR (US)

( * ) Notice: Subject to any disclaimer, the term of this patent is extended or adjusted under 35 U.S.C. 154(b) by 901 days.

(21) Appl. No.: 14/466,875

(22) Filed: Aug. 22, 2014

(65) Prior Publication Data

US 2015/0074119 A1 Mar. 12, 2015

Related U.S. Application Data

(60) Provisional application No. 61/876,980, filed on Sep. 12, 2013.

(51) Int. Cl.
*G06F 17/30* (2006.01)
*G06Q 10/00* (2012.01)
*G06F 17/27* (2006.01)

(52) U.S. Cl.
CPC ........... *G06Q 10/00* (2013.01); *G06F 17/278* (2013.01)

(58) Field of Classification Search
CPC ................................................ G06F 17/30699
USPC ........................................................ 707/748
See application file for complete search history.

(56) References Cited

U.S. PATENT DOCUMENTS

| | | | |
|---|---|---|---|
| 6,604,132 B1 | 8/2003 | Hitt | |
| 6,910,003 B1 * | 6/2005 | Arnold | G06F 17/30616 704/1 |
| 7,694,287 B2 * | 4/2010 | Singh | G06Q 20/40 717/142 |
| 7,827,183 B2 * | 11/2010 | Fraser | G06Q 10/10 707/705 |
| 7,836,134 B2 | 11/2010 | Pantalone | |
| 7,996,372 B2 | 8/2011 | Rubel, Jr. | |
| 8,255,403 B2 * | 8/2012 | Kenedy | G06F 17/30867 705/26.7 |
| 8,458,207 B2 | 6/2013 | Kumar et al. | |
| 8,855,998 B2 * | 10/2014 | Gillam | G06F 17/30985 704/10 |
| 9,031,870 B2 * | 5/2015 | Kenedy | G06F 17/30867 705/26.7 |

(Continued)

FOREIGN PATENT DOCUMENTS

WO 2005/119542 A1 12/2005

OTHER PUBLICATIONS

SimpleRelevance, "Extracting Information from Thin Air: Identity Gender by Email Address," blog.simplerelevance.com (posted Aug. 27, 2013).

(Continued)

*Primary Examiner* — Jean M Corrielus

(57) ABSTRACT

A method and apparatus for name variant extraction from individual handle identifiers uses a sequential extraction process to construct contextual information. Last name data, first/middle name data, initials, nicknames, and vanity names, along with numerical information indicating dates, may all be captured in extracting information about an individual associated with a particular handle. When multiple possible interpretations result from the analysis, those interpretations are ranked using optimality rules. The resulting data may be used to look up additional information in a consumer database in order to structure a targeted marketing message to the individual associated with the handle.

12 Claims, 2 Drawing Sheets

(56) References Cited

U.S. PATENT DOCUMENTS

| | | | | |
|---|---|---|---|---|
| 9,519,681 | B2* | 12/2016 | Tunstall-Pedoe | G06N 5/02 |
| 2004/0093331 | A1* | 5/2004 | Garner | G06N 5/022 |
| 2005/0015376 | A1* | 1/2005 | Fraser | G06Q 30/02 |
| 2007/0005613 | A1* | 1/2007 | Singh | G06Q 20/40 |
| 2008/0140484 | A1* | 6/2008 | Akerman | G06Q 10/06 705/7.11 |
| 2009/0003713 | A1* | 1/2009 | Gupta | G06F 3/038 382/225 |
| 2009/0192968 | A1* | 7/2009 | Tunstall-Pedoe | G06N 5/02 706/47 |
| 2010/0049538 | A1* | 2/2010 | Frazer | G06Q 30/02 705/14.4 |
| 2010/0312549 | A1* | 12/2010 | Akuwudike | G06F 17/276 704/9 |
| 2010/0312837 | A1* | 12/2010 | Bodapati | G06F 17/30864 709/206 |
| 2011/0307435 | A1* | 12/2011 | Overell | G06F 17/278 706/46 |
| 2012/0016660 | A1* | 1/2012 | Gillam | G06F 17/2715 704/8 |
| 2014/0184843 | A1* | 7/2014 | Campbell | G06K 9/6202 348/222.1 |
| 2014/0188864 | A1* | 7/2014 | Bennett | G06F 17/30684 707/730 |
| 2014/0222506 | A1* | 8/2014 | Frazer | G06Q 30/02 705/7.29 |
| 2014/0236630 | A1* | 8/2014 | Murata | G06Q 10/06398 705/3 |
| 2014/0280179 | A1* | 9/2014 | Coleman | G06F 17/30643 707/740 |

OTHER PUBLICATIONS

Kahl, Peter, "Extract Name from Email Address: Extract person name from email address header," www.phpclasses.org (retrieved Sep. 5, 2013).

Tableau Software, "Extract first name and last name from email address," community.tableausoftware.com (posted Apr. 5, 2012).

Minkov, Einat et al., "Extracting Personal Names from Email: Applying Named Entity Recognition to Informal Text" (2005).

Hao Chen et al., "Integrating Geometrical and Linguistic Analysis for Email Signature Block Parsing" (Oct. 31, 1999).

"Regular Expressions—MATLAB & Simulink," www.mathworks.com (downloaded Sep. 5, 2013).

* cited by examiner

NAME VARIANT EXTRACTION FROM INDIVIDUAL HANDLE IDENTIFIERS

CROSS-REFERENCE TO RELATED APPLICATIONS

This application claims the benefit of U.S. provisional patent application No. 61/876,980, filed on Sep. 12, 2013, and entitled "Name Variant Extraction from Individual Handle Identifiers." Such application is incorporated herein by reference in its entirety.

STATEMENT REGARDING FEDERALLY SPONSORED RESEARCH OR DEVELOPMENT

Not applicable.

BACKGROUND OF THE INVENTION

Business are often faced with the task of associating consumer-specific attributes that have importance with respect to marketing campaigns to individuals whose relevant data as known to the business contains incomplete and/or indirect contact information. Without the ability to associate this consumer data to specific, well-defined individuals, the value of this data is significantly diminished. Important examples in online marketing environments include situations where the only available information is a "handle" for the individual, such as an email address or an identifier used in various social media channels, such as Twitter handles and Facebook user names.

Handles may be parsed in order to look for identifying information. Existing parsing applications often give exclusive focus on the identification of first, middle, and last names embedded in an input string, and use fuzzy string matching to find variations of traditional names. Although such approaches may work well for strings primarily composed of names, most of these handles contain either limited traditional name components and/or phrases that identify traits and characteristics of the individual. Very small changes in a given name can result in a word/phrase that clearly describes a personal attribute, and hence the use of fuzzy string matching in these cases may yield poor results.

Marketing efforts vary between the identification of a specific individual for direct marketing and the association of groups of individuals that share interests for online marketing. The association of these handles with a particular individual, or their association with traits associated with certain types of individuals, would be of great value in marketing campaigns, such as the formulation of marketing messages targeted to such individuals.

BRIEF SUMMARY OF THE INVENTION

The present invention in certain embodiments extracts meaningful information from handles to produce a composite interpretation to offer significant insight into expected consumer-specific attributes such as name, gender, ethnicity, and associations to other individuals. Cultural and demographic information as well as country, location affiliation, and language may also be extracted. By extracting an optimal set of name "variants" from these handle identifiers, insights about the associated individual may be found. In certain embodiments, the invention employs a handle parser that offers a best-effort identification and interpretation of the name and name-like components of the handle. It also distinguishes this data from "sentinel" characters that often delimit different contextual components of the handle. Finally, as many handles are interpreted differently by multiple individuals, the parser in certain embodiments does not return a single "best" interpretation but rather a ranked list of possible interpretations of the found attributes from which an end user can choose the one that is most consistent with the perceived context.

These and other features, objects and advantages of the present invention will become better understood from a consideration of the following detailed description of certain embodiments and appended claims in conjunction with the drawings as described following:

DETAILED DESCRIPTION OF THE PREFERRED EMBODIMENT(S)

Figure 1:
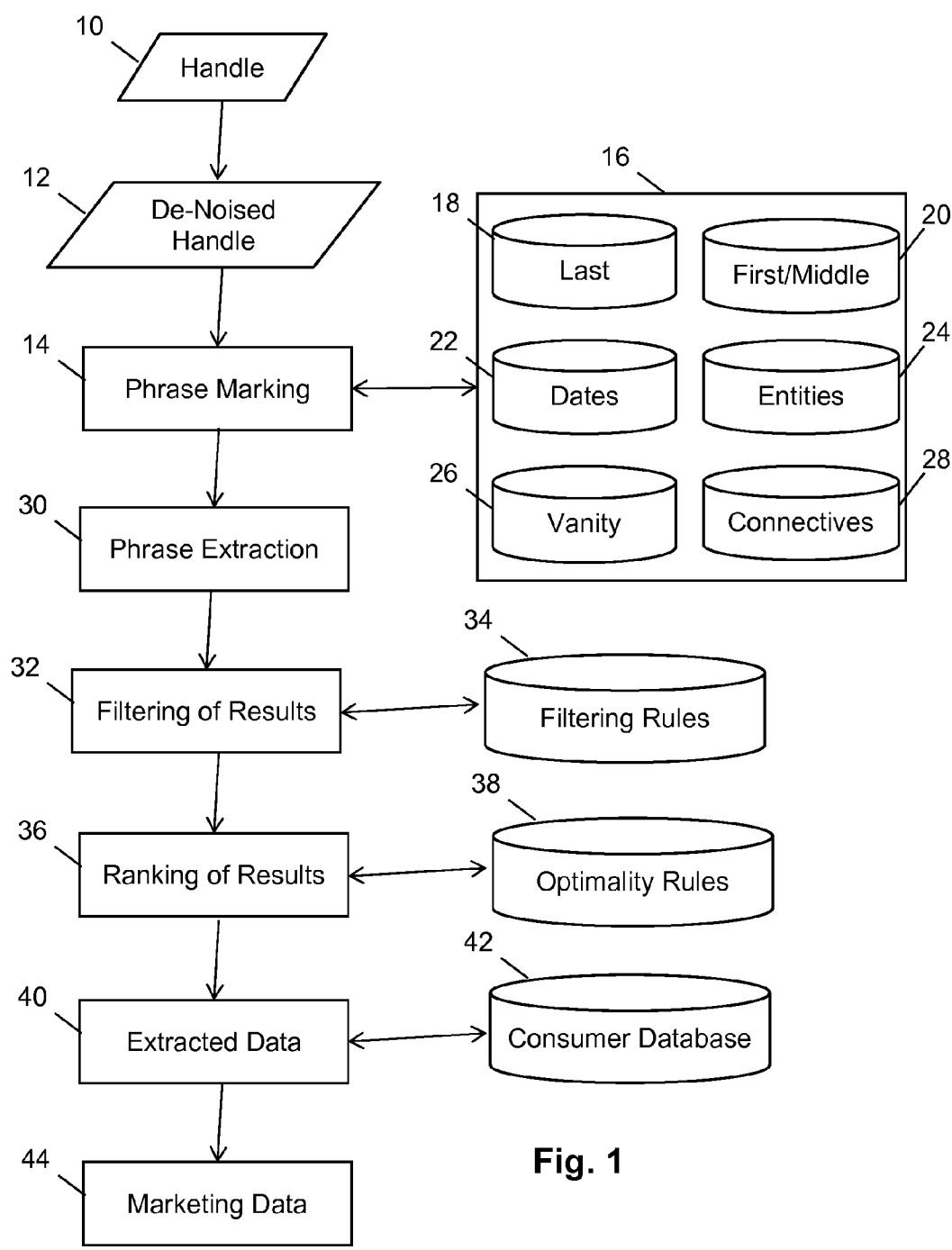
FIG. 1 is a diagram showing a parsing process for handles according to certain embodiments of the present invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

The most obvious attributes that may be used to gain insight into a particular individual associated with a handle are first, middle, and last names. These may appear in a handle, but are often presented in an abbreviated or variant form. For example, an initial may be used for a first, middle, or last name, or a nickname or name variant ("Barbra" for "Barbara", "Willy" for "William") may be presented in place of the first or middle name. Nevertheless, when a name is represented in this manner, it can still often be identified as such by means of a strong co-locational or other linguistic relationship with previously identified potential name components. For example, first names are primarily found "near" last names, where "near" can mean either "separated by a few sentinel characters" or "separated by very few identified entity or vanity phrases. For example, the handle josephvee@hotmail.com is an email address that may be interpreted as referring to a "Joseph V." The "V." may be understood as an initial for a last name. Likewise, "pthemanjohnson_gohogs.com" may be understood to refer to a person named "P. Johnson." In this case, the first name is represented by an initial, with a vanity name ("theman") separating this initial from the last name.

In a similar manner, the actual number of potential first and last names within a handle is often bounded in terms of meaningful interpretation of the handle, and these bounds can be used to interpret the potential meaning of identified name phrases. For example, the phrase "kelly_marie_10" contains two traditionally female first names in close proximity. Since the phrase does not contain a "relationship connective" between the two first names (such as "and", "luvs," or "bff"), these two name components can be interpreted as a first name/middle name component, but the possibility that the two identified names are first names of different individuals cannot be completely ignored. Likewise, without the occurrence of a relationship connective it is quite rare to see multiple last names in a handle that are not joined by a hyphen or ampersand, and an interpretation of more than two identified last names within a handle is extremely difficult without a rich context from the remaining portion of the handle. In certain such instances one or more of these last name components can be interpreted as a first name, often with a much lower but non-zero historical frequency.

As noted above, many name phrases have historically been used as both a first and last name, and in these cases both the positioning of the names as well as historical and demographic frequencies of the use of the names are combined to help rank the most likely interpretation of the phrase. Sometimes two name phrases are constructed from such names, such as "derekleonard" and "terrytalley", and in these cases there can be 4 different meaningful interpretations (first name/middle name, first name/last name, last name/first name, and last name/last name). Each of these interpretations are identified and passed on to the ranking portion of the final possible interpretations of the handle.

In order to identify name types such as these, several public and private name dictionaries (tables) are employed. In addition to offering name-to-name variant relationships, these tables provide gender, ethnicity, and/or country of origin information related to the identified name. Also, they provide frequency of use information that can be used in name type disambiguation mentioned above. In addition, recently in the U.S. there has been a significant shift in first name choices for babies that cannot be adequately reflected by means of the U.S. Census aggregate name data tables. Many of these "newer" names are variants of more traditional ones, but fuzzy string matching approaches often create a large degree of ambiguity and misinterpretation in other types of meaningful phrases in the handles. Hence gender specific first name tables are created from public tables of the most popular first names over the last 20 years. For some sets of handles whose users are primarily from a young population (for example Twitter) these tables can take precedence over the more historical frequency tables, whereas for other handle sources whose primary users are older (e-mail) the historical tables should be given higher priority.

The interpretation of identified potential name phrases depends heavily on a broader contextual understanding of the components of the handle. This context is often constructed by descriptive and connective phrases that can be captured by the use of dictionaries and interpreted in conjunction with the name phrases. This context can disambiguate phrases that can represent popular names, common entities, relationships, and/or actions (such as "love" and "joy"). In addition to this disambiguation step, the "non-name" phrases often represent non-name personal attributes of the individual that are useful for categorizing the individual for marketing efforts.

One type of frequently used phrase is a "vanity" name that often indicates a special interest or demographic attribute of the associated individual. Instances of such vanity names include descriptive words/phrases such as "soccermom" and "sexxy" as well as names from antiquity, mythology, and/or modern pop culture. These types of names are sometimes used for a consistency check of the collection of captured name components in terms of inferred personal attributes such as gender or ethnicity. In the example of "P. Johnson" described above, the vanity name "theman" within the handle is a likely indicator that the individual associated with this handle is male; such information may be valuable since the first initial "P." does not provide gender information. Similarly, the identified phrase "soccermom" indicates that the associated individual is probably female, has one or more children within an age range that have a particular interest in soccer and a more general interest in athletics/sports participation. One or more dictionaries of relevant vanity names will be used in the identification of such vanity names.

Another type of contextual phrase that is useful to capture is an "entity" phrase which identifies a specific or general location ("bavaria", "WindyCity", "bigD"), affiliation with an institution or sports team ("gohogs", "lakersfan", "aggiemom") or a specific interest ("hockeyrulez!", "music", "party_fool"). As noted before, such captured phrases can validate or enhance personal attributes such as gender, ethnicity, interests and location. Multiple dictionaries are used to identify such entity phrases (state, city, city nickname, institutions, institution nicknames, locations such as "bay area" and "rocky_mtn") as well as entity phrase "auxiliary" words such as "go," "boy," "fan," "grad," and "born." As words like "love" can be interpreted in a variety of ways in the contextually limited scope of handles (name phrase, relationship between two name phrases, entity phrase auxiliary word) it is important to identify the type of co-locational words to these, and hence the scope of entity dictionaries needs to be quite broad.

Some handles contain relationship information between multiple instances of name components that represents different individuals such as "suzylovesbill4ever." These relations are important to identify since "Suzy Love" is a potential meaningful full name contained in the handle but clearly cannot be meaningfully inferred as such from the handle. Hence it is important to identify "connectives" and their abbreviated variants within the handle. These connectives include "and", "'n", "loves", and "luvs" and are stored within a single dictionary.

Finally, sequences of two through eight digits can offer temporal information about an individual in terms of a date or year. Such sequences of digits should be viewed as potential "temporal names" that may offer consistency validation or additional evidence of specific attributes. These temporal names often refer to birthdates, birth years, graduation dates, and dates of other significant events in the individual's or related individual's life. The possible contextual interpretation of the actual date and/or year often depends on the relationship of the date to the current date as well as the linguistic or co-locational ties to identified entity phrases. For example, the handle "paul_g_09" can be interpreted as representing an individual whose name is Paul G. and whose (probable high school) graduation year was 2009 (instead of a birth year). Similarly, the handle "wife&mother_JL_7876" can be interpreted as identifying a married woman with children with initials JL and whose birthdate is Jul. 8, 1976 as such date abbreviations frequently occur in handles. When a substring of two to eight consecutive digits is found, it must be determined if that substring can represent a date in terms of its expressive power to identify a month, day, and/or year. Any possible set of ordering of these three date components can be chosen as legitimate patterns, including the option to allow all such orderings.

If such date interpretations are found, the associated digit string is marked with the temporal name meanings. For example, the string '999' can be interpreted as "September, 1999", the string "120513" as "Dec. 5, 2013", and "1123" as "November 23". Some digit strings can be interpreted as a temporal string in multiple valid ways. For example, the digit string "11176" can be interpreted as the temporal name "Jan. 11, 1976" or "Nov. 1, 1976," and each interpretation can be reported. On the other hand the strings "88888" and "767676" do not possess a valid month/day/year interpretation and hence would not be marked as a temporal name. Finally, the number of days in each month and the identification of leap years are used in the interpretation of valid temporal names.

The extraction of information from handles based on the principles set forth above may be described with reference to the flow chart of FIG. 1. A handle 10 is input into the process. The extraction begins with a preprocessing step that attempts to clean the handle of punctuation that is often used as filler or decorations as well as the domain suffix if it is an email address. As mentioned earlier, often sentinel characters are used to embellish parts of the handle. Such examples include "R.A.C.H.E.A.L." and "S*U*Z**I*E*!" The result of this pre-processing is the de-noised handle 12. The removal of such sentinel characters often simplifies the identification of the different name phrases, but some sentinel characters such as "/" can act as meaningful contextual hints within phrases (such as temporal names) that disambiguates the meaning. The set of such potential sentinel characters to be removed can be adjusted within the process, but extra care is taken in the development of the name dictionaries and logic for the identification of temporal names to account for the existence of disambiguating sentinel characters after this pre-processing step.

Once the handle is prepared for subsequent processing, each of the different phrase types are searched for in the string independent of the other types, and the identified phrases are marked both in terms of the phrase type and exact location of the phrase at marking step 14. The resulting sets of marked phrases are independent of the order of the types searched. For example, in the handle "suzylovesbill4eve" each of "suzy," "bill," and "eve" will be marked as potential first names, "love" will be marked as both a potential last name and vanity name, and "loves" will be marked as a potential connective. Marking step 14 utilizes the databases 16 that include one or more databases in the categories last names database 18, first/middle names database 20, dates database 22, entity names database 24, vanity names database 26, and connectives database 28. In certain embodiments, first/middle names database 20 may be divided into multiple databases, such as a traditional first/middle name database and a recent first/middle name database, which may be separately marked in marking step 14.

In order to control the exponential growth of the process of combining different, possibly overlapping instances of phrase types into multiple full handle interpretations, the systematic construction of the interpretation of the handle must not over-populate the growing set of interpretations with logically sound but conceptually meaningless instances, yet it must preserve the vast majority of meaningful instances. This process addresses this issue by first ordering the phrase types at phrase type extraction sequence 30 and progressively constructing the interpretations of the handle in the prescribed order. Any possible ordering of the phrase types is allowable, although specific ones can perform better in certain social media contexts as the frequencies and combinations of the different phrase types can vary greatly across social media platforms. One possible ordering is vanity names, last names, first/middle names, entity names, dates, and connectives. The source of the handle may be used as an input to determine order. For example, where two separate databases are used for traditional first/middle names and recent first/middle names, precedence may be given to the recent first/middle name database where the source of the handle would indicate that the associated individual is more likely to be a young adult.

Prior to the start of the interpretation phase a "maximum allowable overlap" for two substrings is set. This value is important in the interpretation of adjacent phrases as sometimes two phrases intentionally share some consecutive characters. For example, in the string "susanick" the first names "susan" and "nick" share a single character, and without an allowable overlap of at least one character both names would not be included in a common interpretation. Once this overlap value is set the interpretation stage begins with an "empty" interpretation.

Starting with the first chosen phrase type each of its identified words is added one or more times to the growing collection of interpretations. If the word can be added to one or more of the existing interpretations without exceeding the maximum allowable overlap for each phrase in the interpretation that addition is performed and the next word is processed. If the word cannot be added to any existing interpretation, a new interpretation is created with that word and is added to the interpretation collection. Subsequently, each of the remaining phrase types is processed in the same fashion until all phrase types have contributed to the interpretation of the handle.

Prior to creating the ranking of the interpretation results, the collection of the constructed handle interpretations are filtered at filtering step 32 by first expanding the collection and then trimming the collection of "redundant" instances according to filtering rules 34. The expansion is accomplished by creating new instances from each of the existing ones by labeling each found phrase type instance by all of the phrase types for that instance. For example, in the string "suzylovesbill4ever" one resulting interpretation is [FN: suzy, LN:love, FN:bill, FN:eve]. If connectives were extracted after last names then "love" would not have been interpreted as such. So the additional interpretation [FN: suzy, CONN:love, FN:bill, FN:eve] would be added to the collection. In order to minimize the size of the collection there are two different types of "redundancy" that should be addressed. The first type is the obvious one, namely the removal of duplicate interpretations that can potentially be formed in the aforementioned construction and expansion process. The second redundancy occurs when one interpretation is properly contained in another interpretation (both in terms of the phrase types and substrings). For example, for the handle "suzylovesbill" the interpretation [FN:suzy, CONN:love, FN:bill] is completely contained in the interpretation [FN:suzy, CONN:loves, FN:bill] and hence will be removed from collection, retaining the latter interpretation. However, the interpretation [FN:suzy, LN:love, FN:bill] would not be removed as the overlapping strings "love" and "loves" are interpreted as different types of phrases.

The resulting interpretations are then ranked at ranking step 36 based on user-defined criteria stored in optimality rules 38, where the higher ranked interpretations embody these criteria more directly than the lower ranked instances. Types of criteria and their impact on the ranking include the following:

(a) percentage of the handle that was interpreted in terms of the phrase types—adjust the ranked score by an associated percentage increase or decrease relative to a statically fixed or dynamically computed minimally expected percentage;

(b) three or more identified last names—decrease the ranked score by a significant proportion unless an appropriate number and location of first names or vanity names were identified; and (c) connectives with no name phrase on one or both sides of the connective—decrease the ranked score by a significant proportion.

Upon completion of the ranking adjustments, initials can be added at the beginning of found last names or at the end of first names if the appropriate adjacent character has not been included in a phrase in the interpretation.

Any portion of the resulting sorted/ranked list of interpretations can be used to identify an individual, or alternatively sufficient information to determine certain characteristics about this individual, with extracted data 40. This information may be used to search a consumer database 42 in order to collect more data about the individual associated with the handle. For example, if enough name information is found to associate the name with a particular individual consumer, then this information may be used to connect all known information about a particular individual that is found in a general consumer information database. This information is returned as marketing data 44. Otherwise, information that is uncovered may be used to gain additional insights about the individual in order to better prepare a targeted marketing message.

Figure 2:
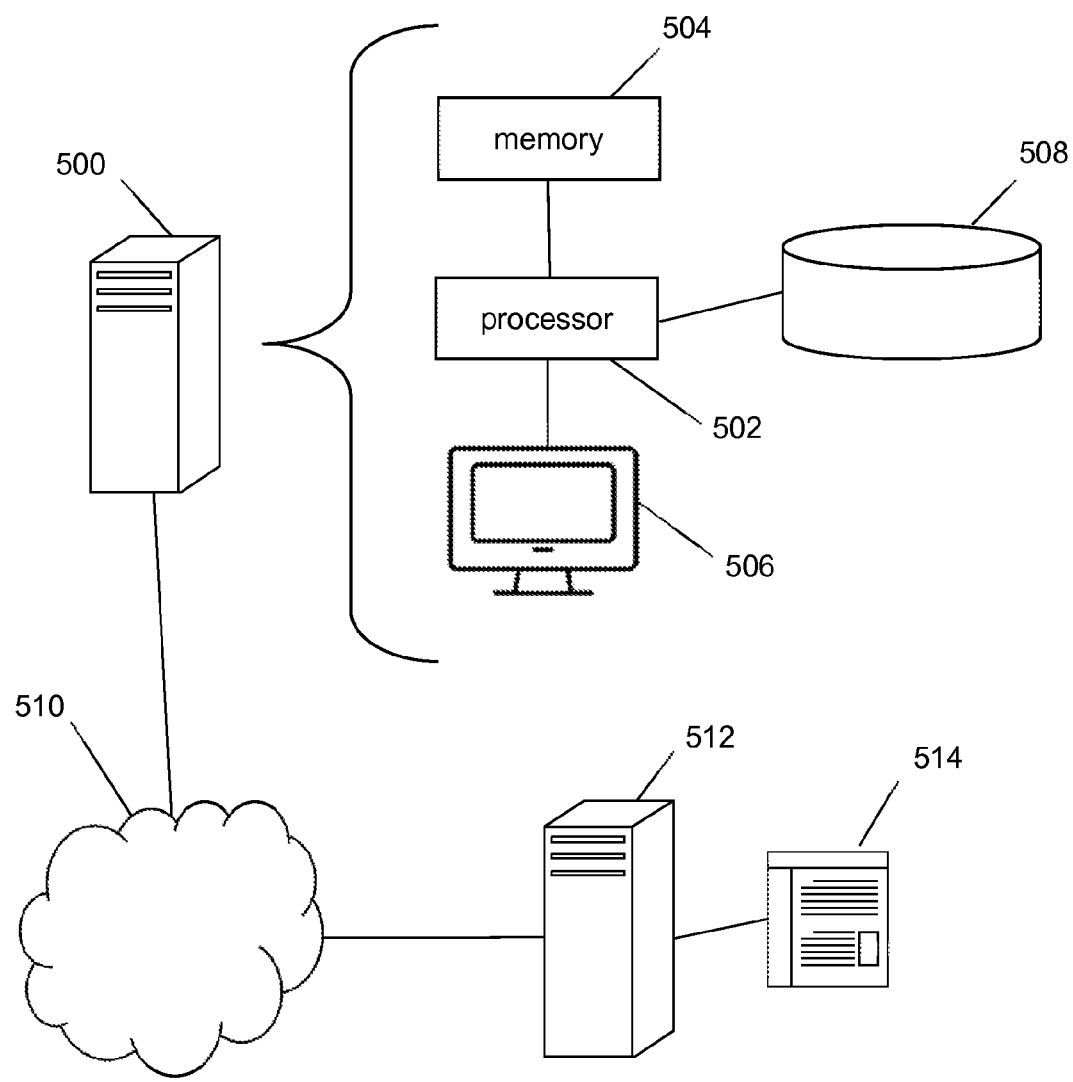
FIG. 2 is a diagram showing functional components of a system according to certain embodiments of the present invention.

The system for implementing the steps of FIG. 1 in certain embodiments of the present invention is a computing device 500 as illustrated in FIG. 2, which is programmed by means of instructions to result in a special-purpose computing device to perform the various functionality described herein. Computing device 500 may be physically implemented in a number of different forms. For example, it may be implemented as a standard computer server as shown in FIG. 2 or as a group of servers, operating either as serial or parallel processing machines.

Computing device 500 includes in the server example of FIG. 2 microprocessor 502, memory 504, an input/output device or devices such as display 506, and storage device 508, such as a solid-state drive or magnetic hard drive. Each of these components is interconnected using various buses or networks, and several of the components may be mounted on a common PC board or in other manners as appropriate.

Microprocessor 502 may execute instructions within computing device 500, including instructions stored in memory 504. Microprocessor 502 may be implemented as a single microprocessor or multiple microprocessors, which may be either serial or parallel computing microprocessors.

Memory 504 stores information within computing device 500. The memory 504 may be implemented as one or more of a computer-readable medium or media, a volatile memory unit or units such as flash memory or RAM, or a non-volatile memory unit or units such as ROM. Memory 504 may be partially or wholly integrated within microprocessor 502, or may be an entirely stand-alone device in communication with microprocessor 502 along a bus, or may be a combination such as on-board cache memory in conjunction with separate RAM memory. Memory 504 may include multiple levels with different levels of memory 504 operating at different read/write speeds, including multiple-level caches as are known in the art.

Display 506 provide for interaction with a user, and may be implemented, for example, as an LCD (light emitting diode) or LCD (liquid crystal display) monitor for displaying information to the user, in addition to a keyboard and a pointing device, for example, a mouse, by which the user may provide input to the computer. Other kinds of devices may be used to provide for interaction with a user as well.

Various implementations of the systems and methods described herein may be realized in computer hardware, firmware, software, and/or combinations thereof. These various implementations may include implementation in one or more computer programs that are executable and/or interpretable on a programmable system including at least one programmable microprocessor 502, which may be special or general purpose, coupled to receive data and instructions from, and to transmit data and instructions to, a storage system, one or more input device, and one or more output device.

The computing system can include a consumer computing device, such as a desktop computer, laptop computer, tablet, smartphone, or embedded device. In the example of FIG. 2, a desktop computer is shown. In this case, client device 512 is the consumer computing device, and runs a web browser 514 in order to access the Internet 510, which allows interconnection with computing device 500. A client and server are generally remote from each other and typically interact through a communication network. Client device 512 may be the source of a handle for processing as described herein, such as when a user is engaging in communications over social media or sending a request for more information through a website operated by a retailer that wishes to send a targeted marketing message to the individual.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and sub-combinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method for extracting information about an individual from a handle, comprising the steps of:

a. receiving the handle at a processor, wherein the handle comprises an identifier associated with an individual in an online environment;

b. marking name phrase types in the handle to create a collection of name phrase types, wherein the name phrase type comprises a first name or a last name or both a first name and a last name by parsing the handle based on a name database, wherein the name database comprises one or more of a last name database comprising a listing of common last names, a first name/middle name database comprising a listing of common first/middle names, a dates database, an entity names database, a vanity names database, and a connectives database;

c. extracting one or more name phrase types from the marked collection of name phrase types to produce one or more handle interpretations, wherein each handle interpretation comprises a possible name for the individual in the online environment;

d. filtering the one or more handle interpretations to eliminate any redundant handle interpretations according to a set of filtering rules, wherein a redundant handle interpretation is a handle interpretation that results in the same name for the individual in the online environment as another handle interpretation; and e. ranking the one or more handle interpretations at least partially according to the likelihood that the handle interpretation results in the correct name for the individual in the online environment utilizing a set of optimality rules.

2. The computer-implemented method for extracting information from an individual handle of claim 1, wherein the name database comprises a male first name database and a female first name database.

3. The computer-implemented method for extracting information from an individual handle of claim 1, wherein the first name database comprises a traditional first name database and a recent first name database.

4. The computer-implemented method for extracting information from an individual handle of claim 3, wherein the first name portion of the marking step is performed with preference to the traditional first name database for a first set of handle sources, and the recent first name database for a second set of handle sources.

5. The computer-implemented method for extracting information from an individual handle of claim 1, further comprising the step of identifying any sentinel characters and removing at least a part of the identified sentinel characters in the handle prior to the marking step.

6. The computer-implemented method for extracting information from an individual handle of claim 5, further comprising the step of identifying and removing only non-disambiguation sentinel characters.

7. The computer-implemented method for extracting information from an individual handle of claim 1, further comprising the step of identifying a maximum string overlap and utilizing the overlap in the extraction step.

8. The computer-implemented method for extracting information from an individual handle of claim 1, wherein the filtering step comprises the step of removing duplicate interpretations.

9. The computer-implemented method for extracting information from an individual handle of claim 8, wherein the filtering step further comprises the step of removing any interpretation that is wholly contained within another interpretation.

10. The computer-implemented method for extracting information from an individual handle of claim 1, wherein the ranking step comprises the step of ranking interpretations of a possible name for the individual in the online environment based on a percentage of the handle that was interpreted in the one or more handle interpretations.

11. The computer-implemented method for extracting information from an individual handle of claim 1, wherein the ranking step comprises the step of ranking interpretations based on a number of last names found in the one or more handle interpretations.

12. The computer-implemented method for extracting information from an individual handle of claim 1, wherein the ranking step comprises the step of ranking interpretations based on the presence of a connective in each of the interpretations without a last name or first name/middle name adjacent to the connective.

\* \* \* \* \*